US008982935B2

(12) United States Patent
Subramanian et al.

(10) Patent No.: US 8,982,935 B2
(45) Date of Patent: Mar. 17, 2015

(54) APPARATUS AND METHOD FOR RANGING USING ROUND-TRIP TIME BY BROADCASTING IN A NETWORK

(71) Applicant: QUALCOMM Incorporated, San Diego, CA (US)

(72) Inventors: Sundar Subramanian, Bridgewater, NJ (US); Venkatesan Nallampatti Ekambaram, Berkeley, CA (US); Xinzhou Wu, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/951,115

(22) Filed: Jul. 25, 2013

(65) Prior Publication Data

US 2015/0029873 A1    Jan. 29, 2015

(51) Int. Cl.
| H04B 1/38 | (2006.01) |
| H04W 4/02 | (2009.01) |
| H04W 24/10 | (2009.01) |
| H04W 56/00 | (2009.01) |

(52) U.S. Cl.
CPC .............. *H04W 4/023* (2013.01); *H04W 24/10* (2013.01); *H04W 56/001* (2013.01)
USPC ........... 375/222; 375/354; 375/346; 375/295; 455/67.11; 455/456.1; 455/456.2; 455/456.3; 455/456.4; 455/456.5; 455/456.6; 455/421; 398/91; 701/93; 701/96; 701/97

(58) Field of Classification Search
USPC ............... 375/222, 354, 346, 295; 455/67.11, 455/456.1, 456.2, 456.3, 456.4, 456.5, 455/456.6, 421; 398/91; 701/93, 96, 97
See application file for complete search history.

(56) References Cited

U.S. PATENT DOCUMENTS

| 6,876,326 | B2 |  | 4/2005 | Martorana |
| 7,194,288 | B2 |  | 3/2007 | Lee et al. |
| 7,574,216 | B2 |  | 8/2009 | Leitch et al. |
| 7,650,155 | B2 |  | 1/2010 | Matsuda et al. |
| 8,542,995 | B2 | * | 9/2013 | Kim ................................ 398/45 |
| 2005/0265503 | A1 | * | 12/2005 | Rofheart et al. .............. 375/354 |
| 2009/0010642 | A1 | * | 1/2009 | Sui et al. ........................... 398/9 |
| 2010/0128617 | A1 | * | 5/2010 | Aggarwal et al. ............. 370/252 |
| 2011/0009132 | A1 | * | 1/2011 | Skarby et al. .............. 455/456.5 |
| 2011/0149779 | A1 |  | 6/2011 | Richards et al. |
| 2011/0170463 | A1 | * | 7/2011 | Aryan et al. .................. 370/281 |
| 2011/0183683 | A1 | * | 7/2011 | Das et al. ................... 455/456.1 |
| 2011/0223905 | A1 |  | 9/2011 | Lee et al. |
| 2011/0292819 | A1 |  | 12/2011 | Ekbal et al. |
| 2014/0059648 | A1 | * | 2/2014 | Danev et al. ....................... 726/3 |

OTHER PUBLICATIONS

International Search Report and Written Opinion—PCT/US2014/047542—ISA/EPO—Nov. 6, 2014.

* cited by examiner

*Primary Examiner* — Siu Lee
(74) *Attorney, Agent, or Firm* — Arent Fox LLP

(57) ABSTRACT

A method, an apparatus, and a computer program product for wireless communication are provided. The apparatus receives a first message from a first wireless communication device and a second message from a second wireless communication device, obtains information associated with a first processing delay with respect to the first message and a second processing delay with respect to the second message, and transmits a third message comprising an indication of the information associated with the first and second processing delays.

51 Claims, 9 Drawing Sheets

APPARATUS AND METHOD FOR RANGING USING ROUND-TRIP TIME BY BROADCASTING IN A NETWORK

BACKGROUND

1. Field

The present disclosure relates generally to communication systems, and more particularly, to a method and apparatus for ranging using round-trip time by broadcasting in a network.

2. Background

Vehicular safety applications enabled by wireless communication capabilities between vehicles through wireless communication protocols, such as IEEE 802.11p, require sub-meter level relative position accuracies. Existing positioning systems, such as the global positing system (GPS), fail to provide such high accuracies. Typically, in order to achieve the required relative positioning accuracies, positioning systems need to be augmented with additional sensors for performing ranging measurements between neighboring vehicles. However, such additional sensors increase both costs and complexity of positioning systems.

SUMMARY

In an aspect of the disclosure, a method, a computer program product, and an apparatus are provided. The apparatus receives a first message from a first wireless communication device and a second message from a second wireless communication device, obtains information associated with a first processing delay with respect to the first message and a second processing delay with respect to the second message, and transmits a third message comprising an indication of the information associated with the first and second processing delays.

DETAILED DESCRIPTION

Figure 1:
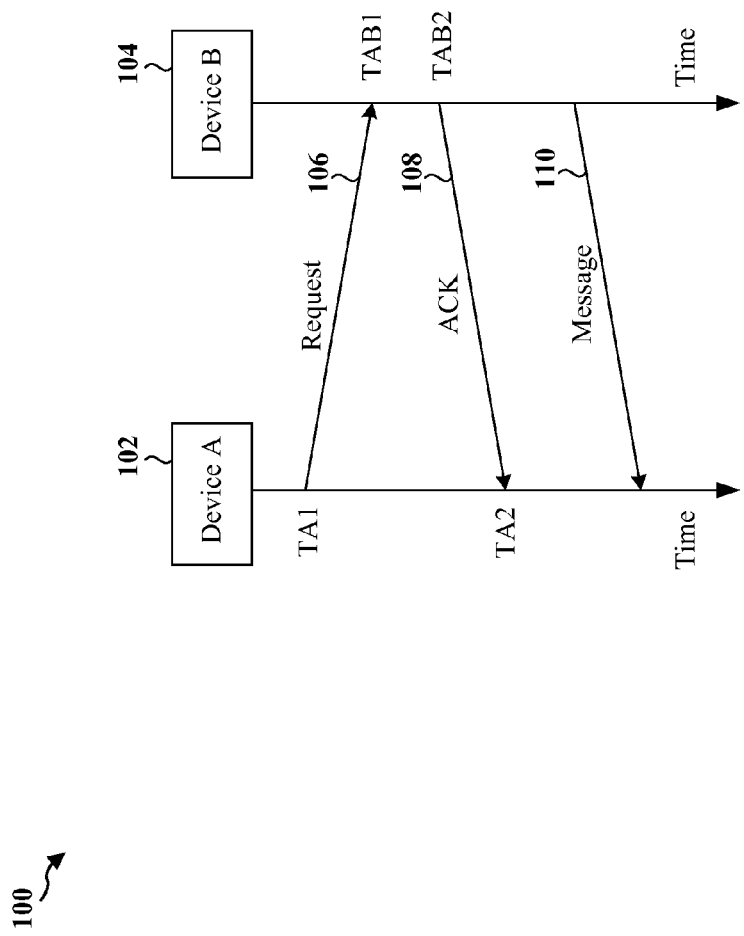
FIG. 1 is a diagram illustrating a ranging procedure between two nodes.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of communication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

As used herein, the term wireless communication device may refer to a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. Moreover, the term wireless communication device may also be referred to by those skilled in the art as a mobile station, a subscriber station, a mobile unit, a subscriber unit, a wireless unit, a remote unit, a mobile device, a wireless device, a remote device, a mobile subscriber station, an access terminal, a mobile terminal, a wireless terminal, a remote terminal, a handset, a user agent, a mobile client, a client, or some other suitable terminology.

FIG. 1 is a diagram 100 illustrating a ranging procedure between two nodes. For example, a ranging procedure may be a procedure performed between two or more nodes for determining the relative distance(s) between the two or more nodes. FIG. 1 includes a first node (also referred to as "device A") 102 and a second node (also referred to as "device B") 104. The device A 102 and the device B 104 may each be a wireless communication device configured to communicate using a wireless communication protocol. For example, the device A 102 and the device B 104 may be configured to use the IEEE 802.11p wireless communication protocol. In an aspect, the device A 102 may be located in one vehicle and the device B 104 may be located in another vehicle.

As shown in FIG. 1, the device A 102 transmits a request 106 to device B 104 at time TA1. In an aspect, the request 106 may be a data packet requesting ranging information from the device B 104. The device B 104 stores the time at which the request 106 is received (e.g., time TAB1) and transmits to the device A 102 an acknowledgment ("ACK") 108 at time TAB2 for the received request 106. The device B 104 determines a processing delay of the device B 104 with respect to the request 106 by determining the difference between the time at which the ACK 108 was transmitted (e.g., time TAB2) and the time at which the request 106 was received (e.g., time TAB1). For example, the processing delay may include a medium access control ("MAC") access delay and/or other delays involved in processing and transmitting the ACK 108.

As shown in FIG. 1, the device B 104 transmits a message 110 that indicates the processing delay of the device B 104 to the device A 102. In an aspect, the message 110 may be a data packet that includes the difference between the time at which the ACK 108 was transmitted (e.g., time TAB2) and the time at which the request 106 was received (e.g., time TAB1). In another aspect, the message 110 may be a data packet that indicates the time at which the ACK 108 was transmitted (e.g., time TAB2) by the device B 104 and the time at which the request 106 was received (e.g., time TAB1) by the device B 104. In such aspect, the device A 102 may determine the processing delay by determining the difference between TAB2 and TAB1. In one example, the message 110 may be a data packet that is transmitted as part of the ACK 108.

For example, the device A 102 may determine a round-trip time ("RTT") with respect to the device B 104. As used herein, the term RTT refers to the total time required for a first wireless signal (e.g., request 106) to travel from a first wireless communication device (e.g., device A 102) to a second wireless communication device (e.g., device B 104) and for a second wireless signal (e.g., ACK 108) to travel from the second wireless communication device (e.g., device B 104) back to the first wireless communication device (e.g., device A 102). In the present example, the device A 102 may determine the RTT with respect to the device B 104 using equation 1:

$$RTT(A,B) = (TA2 - TA1) - (TAB2 - TAB1) \quad \text{(equation 1)}$$

where RTT(A,B) is the round-trip time between the device A 102 and the device B 104, TA1 is the time at which the request 106 was transmitted from the device A 102, TA2 is the time at which the ACK 108 was received at the device A 102, TAB1 is the time at which the request 106 was received at the device B 104, and TAB2 is the time at which the ACK 108 was transmitted from the device B 104. The device A 102 may determine the distance between the device A 102 and the device B 104 using equation 2:

$$Distance(A,B) = RTT(A,B)/2 \times (\text{speed of light}) \quad \text{(equation 2)}$$

Therefore, in order for device A 102 to determine the RTT(A,B), the device B 104 transmits the processing delay (e.g., TAB2−TAB1) of the device B 104 to the device A 102. For example, as previously discussed, the processing delay may be a data packet (e.g., message 110) that is transmitted to the device A 102 as part of the ACK 108. It should be noted that if the ranging procedure described with reference to FIG. 1 is to be performed between pairs of nodes in a network that includes N nodes, then $(N-1)^2$ message exchanges would be required.

As described herein, in order to reduce the required number of message exchanges in a network that includes N nodes, ranging information may be combined for multiple nodes in a single message and transmitted as part of a single data packet. As further described herein, such combining of ranging information in a single message may allow a system including an N number of nodes to obtain all ranging information from neighbor nodes using a minimal number of message transmissions between the neighbor nodes.

Figure 2:
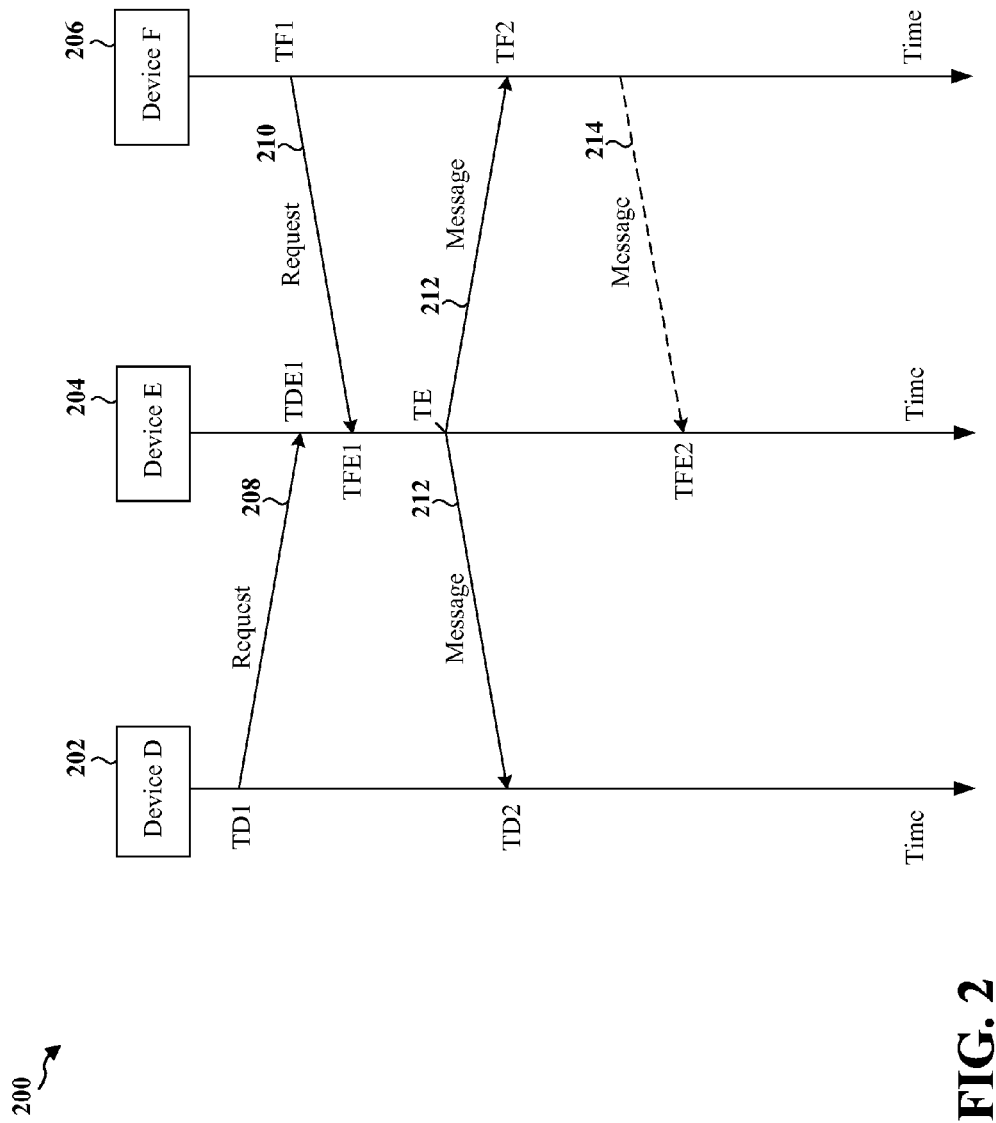
FIG. 2 is a diagram illustrating a ranging procedure between three nodes.

FIG. 2 is a diagram 200 illustrating a ranging procedure between three nodes. FIG. 2 includes a first node (also referred to as "device D") 202, a second node (also referred to as "device E") 204, and a third node (also referred to as "device F") 206. The device D 202, device E 204, and device F 206 may each be a wireless communication device configured to communicate using a wireless communication protocol. For example, the device D 202, device E 204, and device F 206 may be configured to use the IEEE 802.11p wireless communication protocol. In an aspect, the device D 202, device E 204, and device F 206 may each be located in a different vehicle.

In FIG. 2, the device D 202, device E 204, and the device F 206 are configured to measure the time elapsed since a message was last received from a particular wireless communication device. For example, the device E 204 is configured to measure the time elapsed since a message was last received from the device D 202 and the time elapsed since a message was last received from the device F 206. In an aspect, a device (e.g., device E 204) may measure the time elapsed by starting a counter (also referred to as a "timer") for a particular wireless communication device (e.g., device D 202) when a message is received from that particular wireless communication device. In such aspect, the value of the counter maintained by a wireless communication device (e.g., device E 204) for a particular wireless communication device (e.g., device D 202) may represent the difference between the current time and the time since a message was last received from the particular wireless communication device (e.g., device D 202).

With reference to FIG. 2, the device D 202 transmits a request 208 to the device E 204 at time TD1. In an aspect, the request 208 may be a data packet requesting ranging information from the device E 204. The device E 204 receives the request 208 at time TDE1. For example, the device E 204 may start a counter for the device D 202 upon receiving the request 208. The device F 206 transmits a request 210 to the device E 204 at time TF1. In an aspect, the request 210 may be a data packet requesting ranging information from the device E 204. The device E 204 receives the request 210 at time TFE1. For example, the device E 204 may start a counter for the device F 206 upon receiving the request 210. Each of the wireless communication devices in FIG. 2 may store the respective time at which a message was transmitted. For example, device D 202 may store the time TD1 at which request 208 was transmitted and device F 206 may store the time TF1 at which request 210 was transmitted.

As shown in FIG. 2, the device E 204 transmits a message 212 at time TE. In an aspect, and as described infra with respect to FIG. 3, the message 212 may include the device IDs of two or more wireless communication devices from which a message has been received and the corresponding counter values of the two or more wireless communication devices. In an aspect, the message 212 may further include one or more device IDs of devices from which the device E 204 requests ranging information. For example, the message 212 may be a data packet, which is broadcast to other wireless communication devices, such as device D 202 and device F 206. For example, the device E 204 may reset the values of the counters for device D 202 and device F 206 after transmitting the message 212. In an aspect, the device E 204 may transmit the message 212 when the wireless communication resources are available and either the device E 204 requires ranging information from neighboring wireless communication devices or ranging requests are received from a threshold number or neighbor wireless communication devices.

Each wireless communication device that receives the message 212 transmitted by the device E 204 may use the message 212 to determine the RTT with respect to the device E 204. For example, when the device D 202 receives the message 212 from device E 204 at time TD2, the device D 202 may use the message 212 to determine the counter value corresponding to the device D 202. For example, the device D 202 may determine the RTT(D,E) with respect to device E 204 using equation 3:

$$RTT(D,E)=(TD2-TD1)-\text{Counter}(D,E) \qquad \text{(equation 3)}$$

where RTT(D,E) is the round-trip time between the device D 202 and the device E 204, TD1 is the time at which the request 208 was transmitted from the device D 202 to the device E 204, TD2 is the time at which the message 212 was received at device D 202, and the Counter(D,E) is the counter value corresponding to the device D 202. For example, the Counter (D,E) may be the time elapsed since the device E 204 last received a data packet from device D 202. Therefore, in such example, the Counter(D,E) may represent a processing delay of the device E 204 with respect to the request 208 from device D 202. The device D 202 may determine the distance between the device D 202 and the device E 204 using equation 4:

$$\text{Distance}(D,E)=RTT(D,E)/2\times(\text{speed of light}). \qquad \text{(equation 4)}$$

In another example, the device F 206 may determine the RTT(F,E) with respect to device E 204 using equation 5:

$$RTT(F,E)=(TF2-TF1)-\text{Counter}(F,E) \qquad \text{(equation 5)}$$

where RTT(F,E) is the round trip time between the device F 206 and the device E 204, TF1 is the time at which the request 210 was transmitted from the device F 206 to the device E 204, TF2 is the time at which the message 212 was received at the device F 206, and the Counter (F,E) is the counter value corresponding to the device F 206. For example, the Counter (F,E) may be the time elapsed since the device E 204 last received a data packet from device F 206. Therefore, in such example, the Counter(F,E) may represent a processing delay of the device E 204 with respect to the request 210 from device F 206. The device F 206 may determine the distance between the device F 206 and the device E 204 using equation 6:

$$\text{Distance}(F,E)=RTT(F,E)/2\times(\text{speed of light}). \qquad \text{(equation 6)}$$

In an aspect, the message 212 transmitted by device E 204 may include a request for ranging information from device F 206. In such aspect, the device F 206 may measure the time elapsed since a message was last received from device E 204. For example, the device F 206 may measure the time elapsed by starting a counter for the device E 204 when the message 212 is received at the device F 206. For example, the value of the counter maintained by the device F 206 for device E 204 may represent the difference between the current time and the time since the message 212 was last received from the device E 204.

In an aspect, the message 212 may include an accuracy value associated with each corresponding counter value. For example, the message 212 may include a first accuracy value corresponding to Counter (D,E) and may include a second accuracy value corresponding to Counter (F,E). The accuracy value may be a percentage error associated with a corresponding counter value.

In an aspect, the request 208 may include a first identifier and the request 210 may include a second identifier. For example, the first and second identifiers may each be a unique sequence number or a unique transmission identifier. The device E 204 may determine the first identifier from the request 208 and may determine the second identifier from the request 210. The device E 204 may include the first and second identifiers in the message 212. Therefore, by including the first and second identifiers in the message 212, a device (e.g., device D 202) requesting ranging information may then correlate the processing delay (e.g., Counter(D,E)) indicated in the message 212 to a particular request (e.g., request 208).

As shown in FIG. 2, the device F 206 transmits a message 214 after receiving the message 212. In an aspect, the message 214 may include the device identification ("ID") of a device (e.g., device E 204) from which a message (e.g., message 212) has been received and the corresponding counter value of the device (e.g., device E 204). For example, the device F 206 may start the counter upon receiving the message 212 and may indicate the counter value in the message 214. In an aspect, the message 214 may further include one or more device IDs of devices from which the device F 206 requests ranging information. For example, the message 214 may be a data packet, which is broadcast to other wireless communication devices, such as device E 204. In one example, the device F 206 may reset the counter values to zero after transmitting the message 214.

The device E 204 may receive the message 214 at time TFE2 and may use the message 214 to determine the RTT with respect to the device F 206. For example, when the device E 204 receives the message 214 from device F 206 at time TFE2, the device E 204 may use the message 214 to determine the counter value (e.g., Counter(E,F)) corresponding to the device E 204. For example, the device E 204 may determine the RTT(E,F) with respect to device F 206 using equation 7:

$$RTT(E,F)=(TFE2-TE)-\text{Counter}(E,F) \qquad \text{(equation 7)}$$

where RTT(E,F) is the round-trip time between the device E 204 and the device F 206, TE is the time at which the message 212 was transmitted from the device E 204, TFE2 is the time at which the message 214 was received at device E 204, and the Counter (E,F) is the counter value corresponding to the device E 204. For example, the Counter(E,F) may be the time elapsed since the device F 206 last received a data packet from device E 204. Therefore, in such example, the Counter(E,F) may represent a processing delay of the device F 206 with respect to the message 212 from device E 204. The device E 204 may determine the distance between the device E 204 and the device F 206 using equation 8:

$$\text{Distance}(E,F)=RTT(E,F)/2\times(\text{speed of light}). \qquad \text{(equation 8)}$$

In one example, each of an N number of wireless communication devices may send a transmission in one of a number of time slots, such that only one device is allowed to transmit during a particular time slot. Each of the number of time slots may be a predetermined time period, such as 2.0 milliseconds (ms). For example, device D 202 may transmit a message during a first time slot, device E 204 may transmit a message during a second time slot, and device F 206 may transmit a message during a third time slot. Device D 202 may transmit a message that includes the device IDs of devices from which device D 202 is requesting ranging information. For example, a device ID may be any information that may be used to identify a particular wireless communication device, such as device E 204. Device E 204 may receive the message from device D 202 and may transmit in the second time slot a message that contains the counter value (e.g., Counter(D,E)) for device D 202 and also contains the device IDs from which device E 204 requests ranging information. Device F 206 may transmit in the third time slot a message that contains the counter value (e.g., Counter(D,F)) for device D 202 and the counter value (e.g., Counter(E,F)) for device E 204 and also contains the device IDs from which device F 206 is requesting ranging information. Such a sequence of transmissions may continue until all of the devices obtain the required ranging information.

Since the ranging information that needs to be transmitted is small or comparable to the header, the ranging information for multiple wireless communication devices may be combined and transmitted as part of the same data packet in order to amortize the data packet overheads. Therefore, in contrast to the configuration in FIG. 1 where a wireless communication device (e.g., device B 104) transmits a separate and typically lengthy message (e.g., message 110) in response to each ranging request (e.g., ranging request 106), the aspects disclosed with reference to FIG. 2 allows a wireless communication device (e.g., device E 204 of FIG. 2) to reduce the number of message transmissions by combining ranging information for multiple wireless communication devices (e.g., device D 202 and device F 206) into a single message (e.g., message 212). Accordingly, such a single message may be transmitted to the multiple wireless communication devices in a single transmission rather than transmitting separate messages to each of the multiple wireless communication devices.

Figure 3:
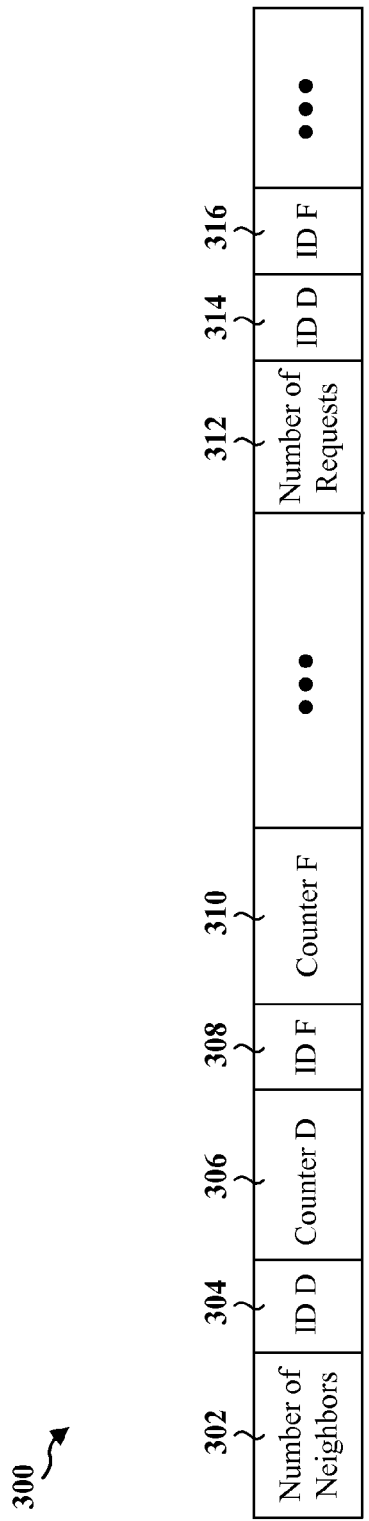
FIG. 3 is a diagram illustrating an example message format.
Figure 4:
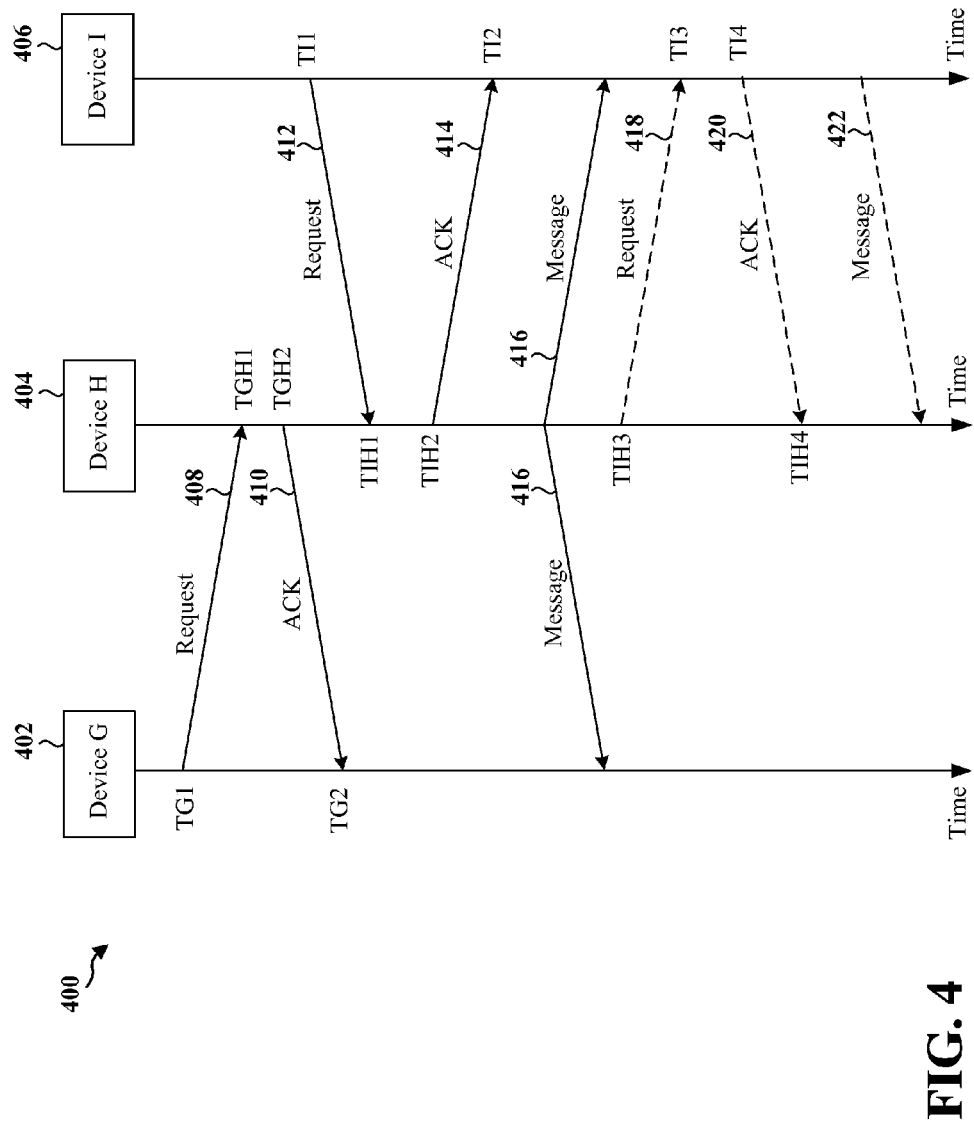
FIG. 4 is a diagram illustrating a ranging procedure between three nodes.

FIG. 3 illustrates an example message format 300. For example, the message format 300 may be used by the device E 204 for transmitting the message 212. As shown in FIG. 3, the message format 300 includes a field 302 for indicating the number of neighbor devices for which counter values are included, a field 304 for indicating an ID of a first wireless communication device (e.g., the ID of device D 202), a field 306 for indicating the counter value for the first wireless communication device (e.g., the counter value for device D 202), a field 308 for indicating an ID of a second wireless communication device (e.g., the ID of device F 206), and a field 310 for indicating the counter value for the second wireless communication device (e.g., the counter value for device F 206). The message format 300 may further include a field 312 for indicating the number of wireless communication devices from which ranging information is being requested, a field 314 for indicating the ID of a first wireless communication device from which ranging information is requested (e.g., the ID of device D 202), and a field 316 for indicating the ID of a second wireless communication device from which ranging information is requested (e.g., the ID of device F 204). In an aspect, the message format 300 may include one or more accuracy values, where each accuracy value is associated with a corresponding counter value. It should be understood that the message format 300 may include additional fields for indicating IDs of additional wireless communication devices and additional fields for indicating the counter values for the corresponding additional wireless communication devices. It should be further understood that the message format 300 may include additional fields for indicating additional wireless communication devices from which ranging information is requested FIG. 4 is a diagram 400 illustrating a ranging procedure between three nodes. FIG. 4 includes a first node (also referred to as "device G") 402, a second node (also referred to as "device H") 404, and a third node (also referred to as "device I") 406. The device G 402, device H 404, and device I 406 may each be a wireless communication device configured to communicate using a wireless communication protocol. For example, the device G 402, device H 404, and device I 406 may be configured to use the IEEE 802.11p wireless communication protocol. In an aspect, the device G 402, device H 404, and device I 406 may each be located in a different vehicle.

As shown in FIG. 4, each wireless communication device that desires to receive ranging information from a neighbor wireless communication device transmits a message to the neighbor wireless communication device requesting ranging information. For example, with reference to FIG. 4, the device G 402 transmits a request 408 to the device H 404 at time TG1. In an aspect, the request 408 may be a data packet including the device ID of device H 404 and requesting ranging information from the device H 404. The device H 404 stores the time at which the request 408 is received (e.g., time TGH1) and transmits to the device G 402 an ACK 410 at time TGH2 for the received request 408. The device H 404 determines a processing delay of the device H 404 with respect to the request 408 from device G 402 by determining the difference between the time at which the ACK 410 was transmitted (e.g., time TGH2) and the time at which the request 408 was received (e.g., time TGH1). For example, the processing delay may include a MAC access delay and/or other delays involved in processing and transmitting the ACK 410.

The device I 406 transmits a request 412 to the device H 404 at time TI1. In an aspect, the request 412 may be a data packet including the device ID of device H 404 and requesting ranging information from the device H 404. The device H 404 stores the time at which the request 412 is received (e.g., time TIH1) and transmits to the device I 406 an ACK 414 at time TIH2 for the received request 412. The device H 404 determines a processing delay of the device H 404 with respect to the request 412 from the device I 406 by determining the difference between the time at which the ACK 414 was transmitted (e.g., time TIH2) and the time at which the request 412 was received (e.g., time TIH1). For example, the processing delay may include a MAC access delay and/or other delays involved in processing and transmitting the ACK 414.

As shown in FIG. 4, the device H 404 transmits a message 416 that indicates the processing delays of the device H 404 with respect to the request 408 from the device G 402 and the request 412 from the device I 406. In an aspect, the message 416 may be a data packet that includes the difference between the time at which the ACK 410 was transmitted (e.g., time TGH2) and the time at which the request 408 was received (e.g., time TGH1). The message 416 may further include the difference between the time at which the ACK 414 was transmitted (e.g., time TIH2) and the time at which the request 412 was received (e.g., time TIH1). In another aspect, the message 416 may be a data packet that indicates the time at which the ACK 410 was transmitted (e.g., time TGH2) and the time at which the request 408 was received (e.g., time TGH1), and the time at which the ACK 414 was transmitted (e.g., time TIH2) and the time at which the request 412 was received (e.g., time TIH1). In such aspect, the device G 402 may determine the processing delay of the device H 404 with respect to the request 408 by determining the difference between TGH2 and TGH1. The device I 406 may determine the processing delay of the device H 404 with respect to the request 412 by determining the difference between TIH2 and TIH1.

In an aspect, the device H 404 may wait until the device H 404 has received requests for ranging information from all neighbor devices prior to transmitting the message 416. In another aspect, the device H 404 may wait until the device H 404 has received a threshold number of requests for ranging information from neighbor devices prior to transmitting the message 416. In another aspect, the device H 404 may transmit the message 416 within a predetermined maximum time period measured from the time at which the request 408 was received (e.g., time TGH1). For example, the predetermined maximum time period may be 32.0 ms. For example, the predetermined maximum time period may be based on an accuracy of a clock in device H 404. In such example, if the accuracy of the clock is low, then the maximum time period may be set to a low time value. However, if the accuracy of the clock is high, then the maximum time period may be set to a high time value.

In an aspect, the message 416 may include an accuracy value associated with each corresponding processing delay. For example, the message 416 may include a first accuracy value corresponding to the processing delay of the device H 404 with respect to the request 408 from the device G 402 and may include a second accuracy value corresponding to the processing delay of the device H 404 with respect to the request 412 from the device I 406. For example, the accuracy value may be a percentage error associated with a corresponding processing delay. For example, the device G 402 may determine the RTT with respect to device H 404 using equation 9:

$$RTT(G,H)=(TG2-TG1)-(TGH2-TGH1) \quad \text{(equation 9)}$$

where RTT(G,H) is the round-trip time between the device G 402 and the device H 404, TG1 is the time at which the request 408 was transmitted from the device G 402, TG2 is the time at which the ACK 410 was received at the device G 402, TGH1 is the time at which the request 408 was received at the device H 404, and TGH2 is the time at which the ACK 410 was transmitted from the device H 404. The device G 402 may determine the distance between the device G 402 and the device H 404 using equation 10:

$$Distance(G,H)=RTT(G,H)/2\times(\text{speed of light}) \quad \text{(equation 10)}$$

As shown in FIG. 4, the device H 404 transmits a request 418 to the device I 406 at time TIH3. In an aspect, the request 418 may be a data packet including the device ID of device I 406 and requesting ranging information from the device I 406. The device I 406 stores the time at which the request 418 is received (e.g., time TI3) and transmits to the device H 404 an ACK 420 at time TI4 for the received request 418. The device I 406 determines a processing delay of the device I 406 with respect to the request 418 from the device H 404 by determining the difference between the time at which the ACK 420 was transmitted (e.g., time TI4) and the time at which the request 418 was received (e.g., time TI3). For example, the processing delay may include a MAC access delay and/or other delays involved in processing and transmitting the ACK 420.

As shown in FIG. 4, the device I 406 transmits a message 422 that indicates the processing delay of the device I 406 with respect to the request 418 from the device H 404. In an aspect, the message 422 may be a data packet that includes the difference between the time at which the ACK 420 was transmitted (e.g., time TI4) and the time at which the request 418 was received (e.g., time TI3). In another aspect, the message 422 may be a data packet that indicates the time at which the ACK 420 was transmitted (e.g., time TI4) and the time at which the request 418 was received (e.g., time TI3). In such aspect, the device H 404 may determine the processing delay of the device I 406 with respect to the request 418 by determining the difference between TI4 and TI3.

For example, the device H 404 may determine the RTT with respect to device I 406 using equation 11:

$$RTT(H,I)=(TIH4-TIH3)-(TI4-TI3) \quad \text{(equation 11)}$$

where RTT(H,I) is the round trip time between the device H 404 and the device I 406, TIH3 is the time at which the request 418 was transmitted from the device H 404, TIH4 is the time at which the ACK 420 was received at the device H 404, TI3 is the time at which the request 418 was received at the device I 406, and TI4 is the time at which the ACK 420 was transmitted from the device I 406. The device H 404 may determine the distance between the device H 404 and the device I 406 using equation 12:

$$Distance(H,I)=RTT(H,I)/2\times(\text{speed of light}) \quad \text{(equation 12)}$$

Figure 5:
FIG. 5 is a diagram illustrating an example message format.

FIG. 5 illustrates an example message format 500. For example, the message format 500 may be used by the device H 404 for transmitting the message 416. As shown in FIG. 5, the message format 500 includes a field 502 for indicating the number of neighbor wireless communication devices with respect to which processing delays of the device H 404 are included, a field 504 for indicating an ID of a first wireless communication device (e.g., the ID of device G 402), a field 506 for indicating the processing delay of the device H 404 with respect to a message received from the first wireless communication device (e.g., the difference between time TGH2 and TGH1), a field 508 for indicating an ID of a second wireless communication device (e.g., the ID of device I 406), and a field 510 for indicating the processing delay of the device H 404 with respect to a message received from the second wireless communication device (e.g., the difference between time TIH2 and TIH1). The message format 500 may further include a field 512 for indicating the number of wireless communication devices from which ranging information is being requested, a field 514 for indicating the ID of a first wireless communication device from which a ranging information is requested (e.g., the ID of device G 402), and a field 516 for indicating the ID of a second wireless communication device from which ranging information is requested (e.g., the ID of device I 406). In an aspect, the message format 500 may include one or more accuracy values, where each accuracy value is associated with a corresponding processing delay. It should be understood that the message format 500 may include additional fields for indicating IDs of additional wireless communication devices and additional fields for indicating the processing delay of the device H 404 with respect to the additional wireless communication devices. It should be further understood that the message format 500 may include additional fields for indicating additional wireless communication devices from which ranging information is requested.

Figure 6:
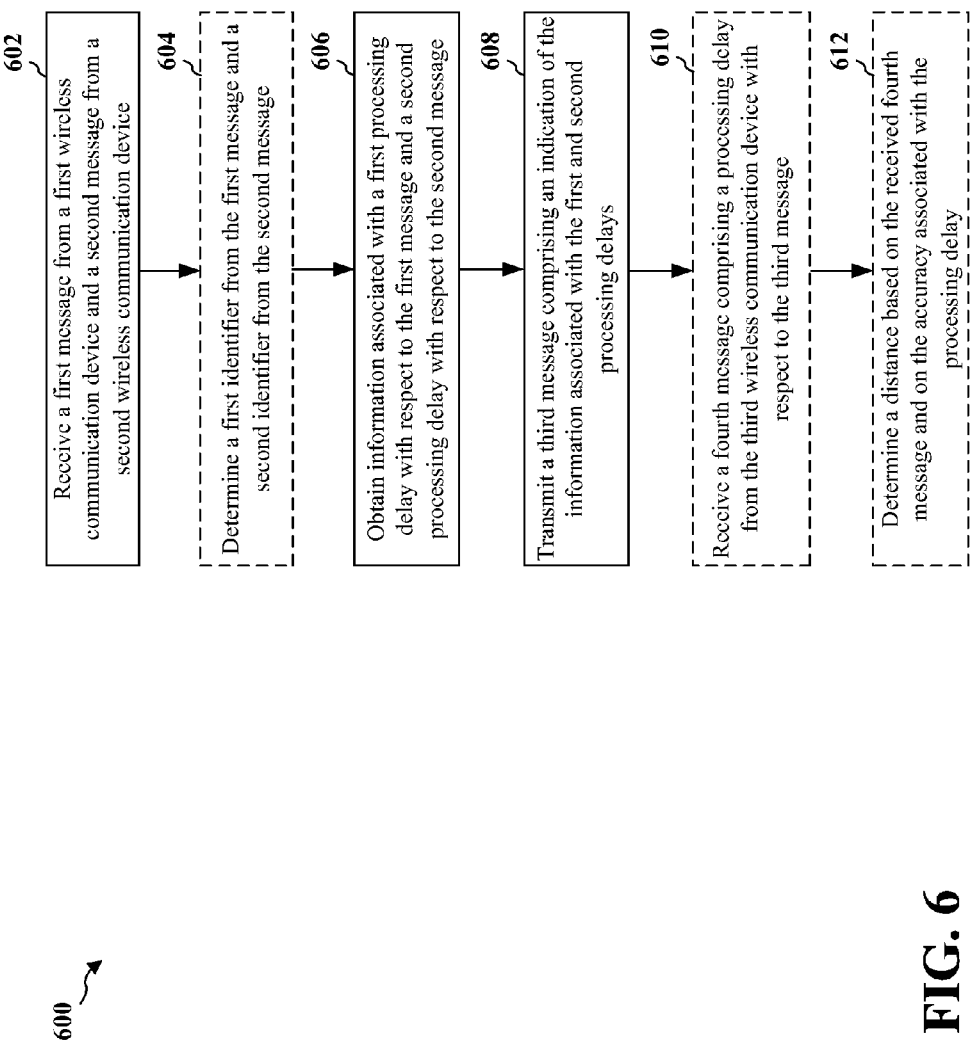
FIG. 6 is a flowchart of a method of wireless communication.

FIG. 6 is a flow chart 600 of a method of wireless communication. The method may be performed by a wireless communication device, such as the device E 204 in FIG. 2.

At step 602, the wireless communication device receives a first message from a first wireless communication device and a second message from a second wireless communication device. For example, with reference to FIG. 2, the first wireless communication device may be device D 202 and the first message may be the request 208. In such example, the second wireless communication device may be device F 206 and the second message may be the request 210. In an aspect, the request 208 and the request 210 may each be a data packet requesting ranging information from the device E 204.

At step 604, the wireless communication device determines a first identifier from the first message and a second identifier from the second message. For example, the first and second identifiers may each be a unique sequence number or a unique transmission identifier.

At step 606, the wireless communication device obtains information associated with a first processing delay with respect to the first message and a second processing delay with respect to the second message. In an aspect, with reference to FIG. 2, the device E 204 obtains information associated with a first processing delay with respect to the first message and a second processing delay with respect to the second message by determining the first processing delay and the second processing delay. For example, the device E 204 may determine the first processing delay by starting a counter for the device D 202 when the request 208 is received from the device D 202. The value of the counter maintained by the device E 204 for the device D 202 may represent the difference between the current time and the time since the request 208 was received from the device D 202. Therefore, the counter for the device D 202 may represent the processing delay of the device E 204 with respect to the request 208 from device D 202. For example, with further reference to FIG. 2, the device E 204 may determine the second processing delay by starting a counter for the device F 206 when the request 210 is received from the device F 206. The value of the counter maintained by the device E 204 for the device F 206 may represent the difference between the current time and the time since the request 210 was received from the device F 206. Therefore, the counter for the device F 206 may represent the processing delay of the device F 206 with respect to the request 210 from device F 206.

At step 608, the wireless communication device transmits a third message comprising an indication of the information associated with the first and second processing delays. In an aspect, the indication of the information associated with the first and second processing delays may be the value of the counter maintained by the device E 204 for the device D 202 and/or the value of the counter maintained by the device E 204 for the device F 206. In an aspect, the third message includes an accuracy associated with the first processing delay and/or an accuracy associated with the second processing delay. For example, and as previously discussed, the first processing delay may be a first counter value and the second processing delay may be a second counter value. In such example, the accuracy associated with the first processing delay and/or the accuracy associated with the second processing delay may each be a percentage error.

In an aspect, the first message is received at a first time, the second message is received at a second time, and the third message is transmitted at a third time, where the first processing delay is a difference between the third time and the first time and the second processing delay is a difference between the third time and the second time. For example, with reference to FIG. 2, the first message may be the request 208 received at the device E 204 at time TDE1, the second message may be the request 210 received at the device E 204 at time TFE1, and the third message may be the message 212 broadcast by the device E 204 at time TE. In such example, the first processing delay may be the difference between times TE and TDE1 and the second processing delay may be the difference between times TE and TFE1.

In an aspect, the third message may include the first identifier and the second identifier. For example, with reference to FIG. 2, the third message may be the message 212 and the first and/or second identifiers may be included in the message 212. In such example, by including the first identifier in the message 212, the device D 202 requesting ranging information from the device E 204 may then correlate the processing delay (e.g., Counter(D,E)) in the message 212 to the request 208. Furthermore, by including the second identifier in the message 212, the device F 206 requesting ranging information from the device E 204 may then correlate the processing delay (e.g., Counter(F,E)) in the message 212 to the request 210.

In an aspect, the third message is transmitted by broadcasting the third message to the first and second wireless communication devices. In an aspect, the second message is subsequent to the first message. In such aspect, the third message is transmitted within a predetermined maximum time period with respect to the first message, the maximum time period being based on a clock accuracy. For example, the predetermined maximum time period may be based on an accuracy of a clock in device E 204. In such example, if the accuracy of the clock is low, then the maximum time period may be set to a low time value. However, if the accuracy of the clock is high, then the maximum time period may be set to a high time value. In an aspect, the third message includes at least one identifier of a wireless communication device from which ranging information is requested.

At step 610, when the third message includes a request for ranging information from a third wireless communication device, the wireless communication device receives a fourth message comprising a processing delay from the third wireless communication device with respect to the third message. For example, with reference to FIG. 2, the third message may be the message 212 and the fourth message may be the message 214 received from the device F 206. Accordingly, in this example, device F 206 represents both the second wireless communication device and the third wireless communication device. In other aspects, however, the second and third wireless communication devices may be different wireless communication devices. The message 214 may include the device ID of the device E 204 from which the message 212 was received and the corresponding counter value of the device E 204 with respect to the message 212. In an aspect, the fourth message includes an accuracy associated with the processing delay. For example, the accuracy may be a percentage error of the counter value of the device E 204 with respect to the message 212.

At step 612, the wireless communication device determines a distance based on the received fourth message and on an accuracy associated with the processing delay. In an aspect, the determined distance may be a distance to the wireless communication device from which the fourth message was received. For example, with reference to FIG. 2, the fourth message may be the message 214 received from the device F 206. As shown in FIG. 2, the device E 204 may receive the message 214 at time TFE2 and may use the message 214 to determine the RTT with respect to the device F 206 using equation 7 as previously described. The accuracy associated with the processing delay may be used to determine the upper and lower bounds of the RTT and for determining an average value of the RTT based on the upper and lower bounds. The device E 204 may then determine the distance between the device E 204 and the device F 206 using equation 8 as previously described.

It should be understood that the steps 604, 610, and 612 indicated with dotted lines in FIG. 6 represent optional steps. For example, in one embodiment, steps 602, 606, and 608 may be performed without performing steps 604, 610, and 612. It should be further understood that various combinations of the steps 604, 610, and 612 may be performed in accordance with various embodiments. For example, in one embodiment, steps 602, 604, 606, and 608 may be performed without performing steps 610 and 612.

Figure 7:
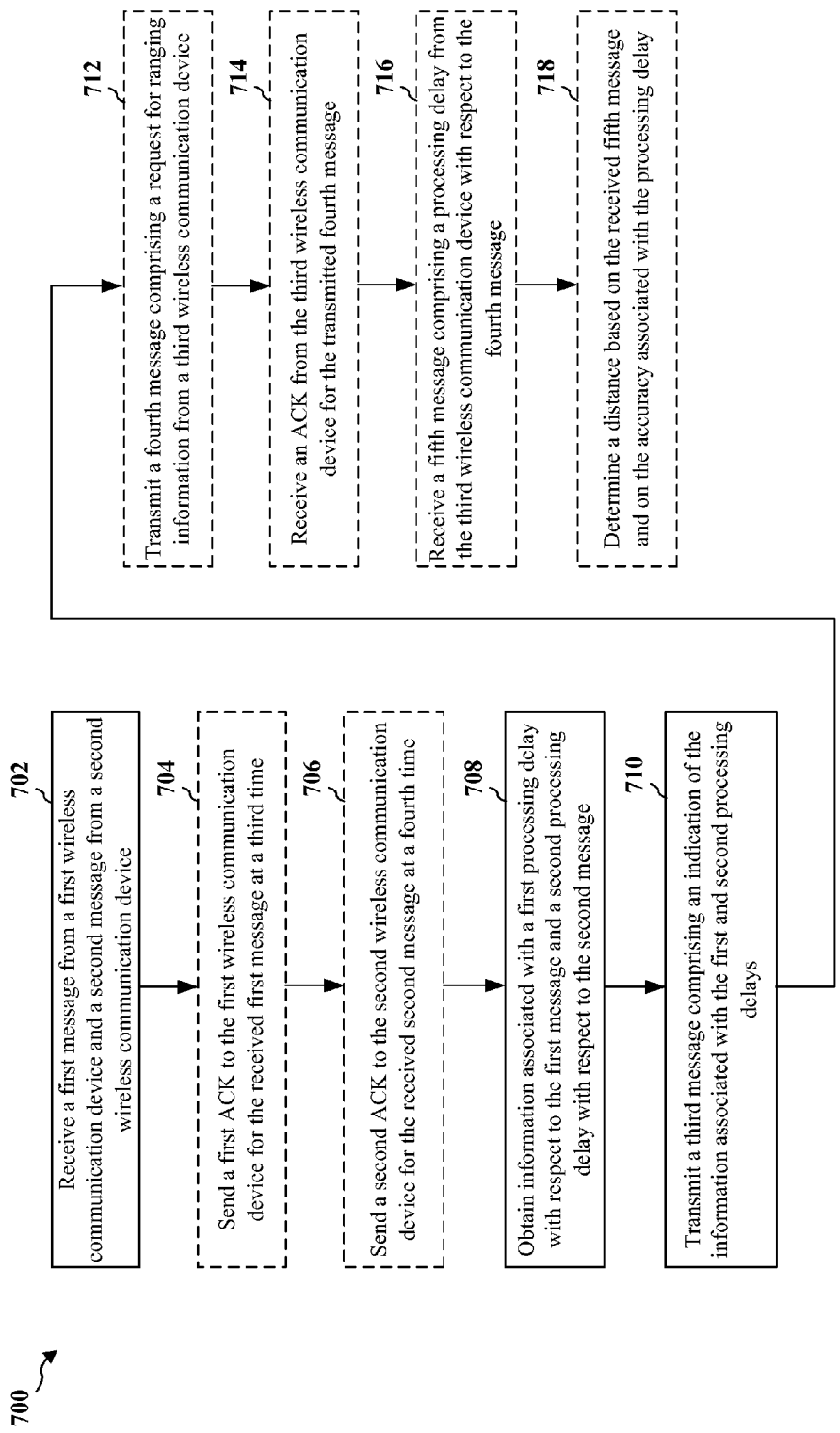
FIG. 7 is a flowchart of a method of wireless communication.

FIG. 7 is a flow chart 700 of a method of wireless communication. The method may be performed by a wireless communication device, such as the device H 404 in FIG. 4.

At step 702, the wireless communication device receives a first message from a first wireless communication device and a second message from a second wireless communication device. For example, with reference to FIG. 4, the first wireless communication device may be device G 402 and the first message may be the request 408. In such example, the second wireless communication device may be device I 406 and the second message may be the request 412. In an aspect, the request 408 and the request 412 may each be a data packet requesting ranging information from the device E 204.

At step 704, the wireless communication device sends a first ACK to the first wireless communication device for the received first message at a third time. For example, with reference to FIG. 4, the first ACK may be the ACK 410 transmitted by the device H 404 for the received request 408.

At step 706, the wireless communication device sends a second ACK to the second wireless communication device for the received second message at a fourth time. For example, with reference to FIG. 4, the second ACK may be the ACK 414 transmitted by the device H 404 for the received request 412.

At step 708, the wireless communication device obtains information associated with a first processing delay with respect to the first message and a second processing delay with respect to the second message. In an aspect, with reference to FIG. 4, the device H 404 obtains information associated with a first processing delay with respect to the first message and a second processing delay with respect to the second message by determining the first processing delay and the second processing delay. For example, device H 404 may determine the first processing delay by determining the difference between the time at which the ACK 410 was transmitted (e.g., time TGH2) and the time at which the request 408 was received (e.g., time TGH1). The device H 404 may determine the second processing delay by determining the difference between the time at which the ACK 414 was transmitted (e.g., time TIH2) and the time at which the request 412 was received (e.g., time TIH1).

At step 710, the wireless communication device transmits a third message comprising an indication of the information associated with the first and second processing delays. In an aspect, with reference to FIG. 4, the indication of the information associated with the first processing delay may be the difference between the time at which the ACK 410 was transmitted (e.g., time TGH2) and the time at which the request 408 was received (e.g., time TGH1). In such aspect, the indication of the information associated with the second processing delay may be the difference between the time at which the ACK 414 was transmitted (e.g., time TIH2) and the time at which the request 412 was received (e.g., time TIH1). In another aspect, with reference to FIG. 4, the indication of the information associated with the first processing delay may be the time at which the ACK 410 was transmitted (e.g., time TGH2) and the time at which the request 408 was received (e.g., time TGH1). In such aspect, the indication of the information associated with the second processing delay may be the time at which the ACK 414 was transmitted (e.g., time TIH2) and the time at which the request 412 was received (e.g., time TIH1).

In an aspect, the third message is transmitted by broadcasting the third message to the first and second wireless communication devices. In an aspect, the second message is subsequent to the first message. In such aspect, the third message is transmitted within a predetermined maximum time period with respect to the first message, the maximum time period being based on a clock accuracy. For example, the predetermined maximum time period may be based on an accuracy of a clock in device H 404. In such example, if the accuracy of the clock is low, then the maximum time period may be set to a low time value. However, if the accuracy of the clock is high, then the maximum time period may be set to a high time value. In an aspect, the third message includes at least one identifier of a wireless communication device from which ranging information is requested.

At step 712, the wireless communication device transmits a fourth message comprising a request for ranging information from a third wireless communication device. For example, with reference to FIG. 4, the third wireless communication device may be device I 406 and the fourth message may be the request 418. Accordingly, in this example, device I 406 represents both the second wireless communication device and the third wireless communication device. In other aspects, however, the second and third wireless communication devices may be different wireless communication devices.

At step 714, the wireless communication device receives an ACK from the third wireless communication device for the transmitted fourth message. For example, with reference to FIG. 4, the ACK received from the third wireless communication device may be the ACK 420.

At step 716, the wireless communication device receives a fifth message including an indication of the information associated with the third processing delay from the third wireless communication device with respect to the fourth message. For example, with reference to FIG. 4, the fifth message received from the third wireless communication device may be the message 422.

At step 718, the wireless communication device determines a distance based on the received fifth message and on the accuracy associated with the processing delay. In an aspect, the determined distance may be a distance to the third wireless communication device to which the request 418 was transmitted. For example, with reference to FIG. 4, the fifth message may be the message 422 received from the device I 406. The message 422 may be a data packet that includes the processing delay of the device I 406 with respect to the request 418. For example, the processing delay may be the difference between the time at which the ACK 420 was transmitted (e.g., time TI4) and the time at which the request 418 was received (e.g., time TI3). The device H 404 may use the processing delay (e.g., the difference between time TI4 and time TI3), the time at which the request 418 was transmitted (e.g., time TIH3), and the time at which the ACK 420 was received (e.g., time TIH4) to determine the RTT with respect to the device I 406 using equation 11 as previously described. The accuracy associated with the processing delay may be used to determine the upper and lower bounds of the RTT and determine an average value of the RTT based on the upper and lower bounds. The device H 404 may then determine the distance between the device H 404 and the device I 406 using equation 12 as previously described.

It should be understood that the steps 704, 706, 712, 714, 716, and 718 indicated with dotted lines in FIG. 7 represent optional steps. For example, in one embodiment, steps 702, 708, and 710 may be performed without performing steps 704, 706, 712, 714, 716, and 718. It should be further understood that various combinations of the steps 704, 706, 712, 714, 716, and 718 may be performed in accordance with various embodiments. For example, in one embodiment, steps 702, 704, 706, 708 and 710 may be performed without performing steps 712, 714, 716, and 718.

Figure 8:
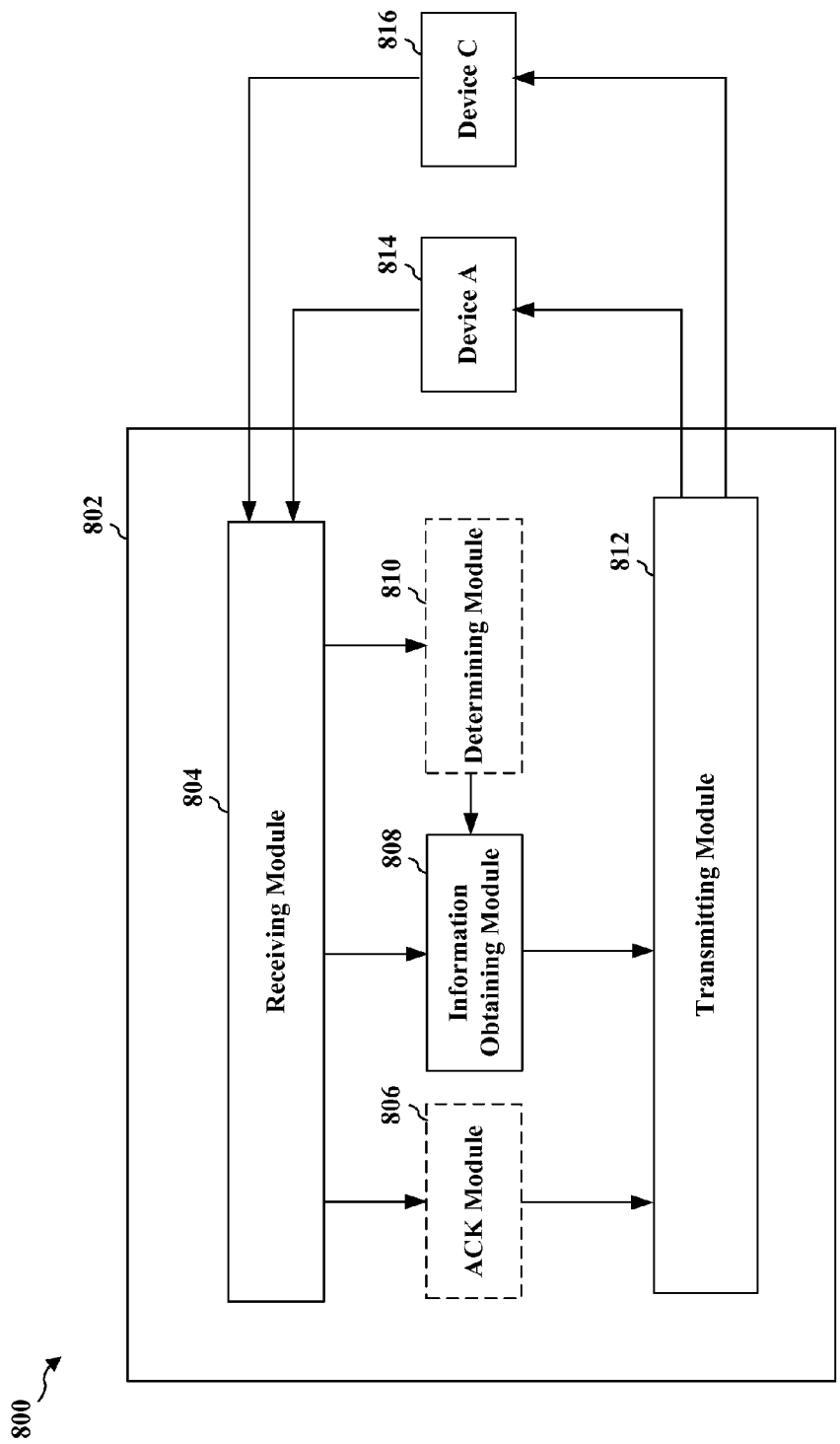
FIG. 8 is a conceptual data flow diagram illustrating the data flow between different modules/means/components in an exemplary apparatus.

FIG. 8 is a conceptual data flow diagram 800 illustrating the data flow between different modules/means/components in an exemplary apparatus 802. The apparatus may be a wireless communication device, such as device E 204 in FIG. 2 or device H 404 in FIG. 4. The apparatus includes a module 804 that receives a first message from a first wireless communication device (e.g., device A 814) and a second message from a second wireless communication device (e.g., device C 816), receives a fourth message comprising a processing delay from the third wireless communication device with respect to a third message, receives an ACK from the third wireless communication device for the transmitted fourth message, and receives a fifth message including a processing delay from the third wireless communication device with respect to the fourth message. The apparatus further includes a module 806 that sends (via transmitting module 812) a first ACK to the first wireless communication device for the received first message at a third time and sends a second ACK (via transmitting module 812) to the second wireless communication device for the received second message at a fourth time. The apparatus further includes a module 808 that obtains information associated with a first processing delay with respect to the first message and a second processing delay with respect to the second message. The apparatus further includes a module 810 that determines a first identifier from the first message and a second identifier from the second message, determines a distance based on the received fourth message and on the accuracy associated with the processing delay, and determines a distance based on the received fifth message and on the accuracy associated with the processing delay. The apparatus further includes a module 812 that transmits a third message comprising an indication of the information associated with the first and second processing delays, transmits a third message comprising an indication of the information associated with the first and second processing delays, and transmits a fourth message comprising a request for ranging information from a third wireless communication device.

The apparatus may include additional modules that perform each of the steps of the algorithm in the aforementioned flow charts of FIGS. 2 and 4. As such, each step in the aforementioned flow chart of FIGS. 2 and 4 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 9:
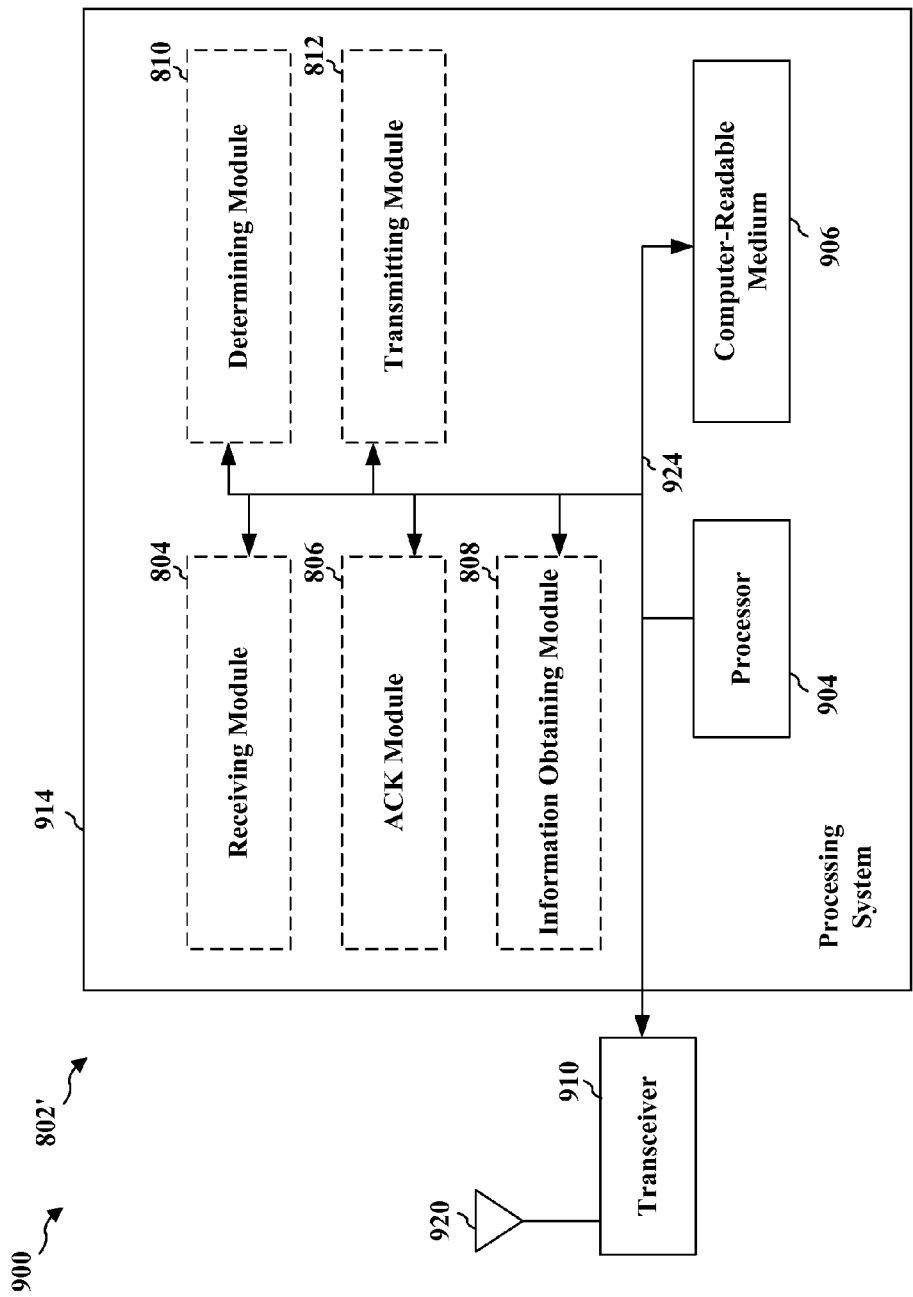
FIG. 9 is a diagram illustrating an example of a hardware implementation for an apparatus employing a processing system.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware modules, represented by the processor 904, the modules 804, 806, 808, 810, and 812, and the computer-readable medium 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the receiving module 804. In addition, the transceiver 910 receives information from the processing system 914, specifically the transmission module 812, and based on the received information, generates a signal to be applied to the one or more antennas 920. The processing system 914 includes a processor 904 coupled to a computer-readable medium 906. The processor 904 is responsible for general processing, including the execution of software stored on the computer-readable medium 906. The software, when executed by the processor 904, causes the processing system 914 to perform the various functions described supra for any particular apparatus. The computer-readable medium 906 may also be used for storing data that is manipulated by the processor 904 when executing software. The processing system further includes at least one of the modules 804, 806, 808, 810, and 812. The modules may be software modules running in the processor 904, resident/stored in the computer readable medium 906, one or more hardware modules coupled to the processor 904, or some combination thereof.

In one configuration, the apparatus 802/802' for wireless communication includes means for receiving a first message from a first wireless communication device and a second message from a second wireless communication device, means for obtaining information associated with a first processing delay with respect to the first message and a second processing delay with respect to the second message, means for transmitting a third message comprising an indication of the information associated with the first and second processing delays, means for determining a first identifier from the first message and a second identifier from the second message, means for receiving a fourth message comprising a processing delay from the third wireless communication device with respect to the third message, means for determining a distance based on the received fourth message and on the accuracy associated with the processing delay, means for sending a first ACK to the first wireless communication device for the received first message at a third time, means for sending a second ACK to the second wireless communication device for the received second message at a fourth time, means for transmitting a fourth message comprising a request for ranging information from a third wireless communication device, means for receiving an ACK from the third wireless communication device for the transmitted fourth message, means for receiving a fifth message comprising a processing delay from the third wireless communication device with respect to the fourth message, and means for determining a distance based on the received fifth message and on the accuracy associated with the processing delay. The aforementioned means may be one or more of the aforementioned modules of the apparatus 802 and/or the processing system 914 of the apparatus 802' configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication comprising:
   receiving a first message from a first wireless communication device and a second message from a second wireless communication device;
   obtaining information associated with a first processing delay with respect to the first message and a second processing delay with respect to the second message; and
   transmitting a third message comprising:
      an indication of the information associated with the first and second processing delays, and
      an accuracy associated with the first and second processing delays.

2. The method of claim 1, wherein obtaining information associated with a first processing delay with respect to the first message and a second processing delay with respect to the second message comprises determining the first processing delay and the second processing delay.

3. The method of claim 1, wherein transmitting the third message comprises broadcasting the third message to the first and second wireless communication devices.

4. The method of claim 1, the third message further comprising at least one identifier of a wireless communication device from which ranging information is requested.

5. The method of claim 1, wherein the first message is received at a first time, the second message is received at a second time, and the third message is transmitted at a third time, wherein the first processing delay is a difference between the third time and the first time and the second processing delay is a difference between the third time and the second time.

6. The method of claim 5, wherein the first, second, and third times are different.

7. The method of claim 1, further comprising determining a first identifier from the first message and a second identifier from the second message, wherein the third message further comprises the first identifier and the second identifier.

8. The method of claim 1, the third message further comprising a request for ranging information from a third wireless communication device, the method further comprising receiving a fourth message comprising a processing delay from the third wireless communication device with respect to the third message.

9. The method of claim 8, the fourth message further comprising an accuracy associated with the processing delay.

10. The method of claim 9, further comprising determining a distance based on the received fourth message and on the accuracy associated with the processing delay.

11. The method of claim 1, wherein the first message is received at a first time and the second message is received at a second time, the method further comprising:
   sending a first acknowledgment (ACK) to the first wireless communication device for the received first message at a third time; and
   sending a second ACK to the second wireless communication device for the received second message at a fourth time;
   wherein the first processing delay is a difference between the third time and the first time and the second processing delay is a difference between the fourth time and the second time.

12. The method of claim 1, further comprising:
   transmitting a fourth message comprising a request for ranging information from a third wireless communication device;
   receiving an acknowledgment (ACK) from the third wireless communication device for the transmitted fourth message; and
   receiving a fifth message comprising a processing delay from the third wireless communication device with respect to the fourth message.

13. The method of claim 12, the fourth message further comprising an accuracy associated with the processing delay.

14. The method of claim 13, further comprising determining a distance based on the received fifth message and on the accuracy associated with the processing delay.

15. A method of wireless communication comprising:
   receiving a first message from a first wireless communication device and a second message from a second wireless communication device;
   obtaining information associated with a first processing delay with respect to the first message and a second processing delay with respect to the second message; and
   transmitting a third message comprising an indication of the information associated with the first and second processing delays,
   wherein the second message is subsequent to the first message, and wherein the third message is transmitted within a predetermined maximum time period with respect to the first message, the maximum time period being based on a clock accuracy.

16. An apparatus for wireless communication, comprising:
means for receiving a first message from a first wireless communication device and a second message from a second wireless communication device;
means for obtaining information associated with a first processing delay with respect to the first message and a second processing delay with respect to the second message; and
means for transmitting a third message comprising:
an indication of the information associated with the first and second processing delays, and
an accuracy associated with the first and second processing delays.

17. The apparatus of claim 16, wherein obtaining information associated with a first processing delay with respect to the first message and a second processing delay with respect to the second message comprises determining the first processing delay and the second processing delay.

18. The apparatus of claim 16, wherein transmitting the third message comprises broadcasting the third message to the first and second wireless communication devices.

19. The apparatus of claim 16, the third message further comprising at least one identifier of a wireless communication device from which ranging information is requested.

20. The apparatus of claim 16, wherein the first message is received at a first time, the second message is received at a second time, and the third message is transmitted at a third time, wherein the first processing delay is a difference between the third time and the first time and the second processing delay is a difference between the third time and the second time.

21. The apparatus of claim 20, wherein the first, second, and third times are different.

22. The apparatus of claim 16, further comprising means for determining a first identifier from the first message and a second identifier from the second message, wherein the third message further comprises the first identifier and the second identifier.

23. The apparatus of claim 16, the third message further comprising a request for ranging information from a third wireless communication device, the apparatus further comprising means for receiving a fourth message comprising a processing delay from the third wireless communication device with respect to the third message.

24. The apparatus of claim 23, the fourth message further comprising an accuracy associated with the processing delay.

25. The apparatus of claim 24, further comprising means for determining a distance based on the received fourth message and on the accuracy associated with the processing delay.

26. The apparatus of claim 16, wherein the first message is received at a first time and the second message is received at a second time, the apparatus further comprising:
means for sending a first acknowledgment (ACK) to the first wireless communication device for the received first message at a third time; and
means for sending a second ACK to the second wireless communication device for the received second message at a fourth time;
wherein the first processing delay is a difference between the third time and the first time and the second processing delay is a difference between the fourth time and the second time.

27. The apparatus of claim 16, further comprising:
means for transmitting a fourth message comprising a request for ranging information from a third wireless communication device;
means for receiving an acknowledgment (ACK) from the third wireless communication device for the transmitted fourth message; and
means for receiving a fifth message comprising a processing delay from the third wireless communication device with respect to the fourth message.

28. The apparatus of claim 27, the fourth message further comprising an accuracy associated with the processing delay.

29. The apparatus of claim 28, further comprising means for determining a distance based on the received fifth message and on the accuracy associated with the processing delay.

30. An apparatus for wireless communication, comprising:
means for receiving a first message from a first wireless communication device and a second message from a second wireless communication device;
means for obtaining information associated with a first processing delay with respect to the first message and a second processing delay with respect to the second message; and
means for transmitting a third message comprising an indication of the information associated with the first and second processing delays,
wherein the second message is subsequent to the first message, and wherein the third message is transmitted within a predetermined maximum time period with respect to the first message, the maximum time period being based on a clock accuracy.

31. An apparatus for wireless communication, comprising:
a memory; and
at least one processor coupled to the memory and configured to:
receive a first message from a first wireless communication device and a second message from a second wireless communication device;
obtain information associated with a first processing delay with respect to the first message and a second processing delay with respect to the second message; and
transmit a third message comprising:
an indication of the information associated with the first and second processing delays and,
an accuracy associated with the first and second processing delays.

32. The apparatus of claim 31, wherein obtaining information associated with a first processing delay with respect to the first message and a second processing delay with respect to the second message comprises determining the first processing delay and the second processing delay.

33. The apparatus of claim 31, wherein transmitting the third message comprises broadcasting the third message to the first and second wireless communication devices.

34. The apparatus of claim 31, the third message further comprising at least one identifier of a wireless communication device from which ranging information is requested.

35. The apparatus of claim 31, wherein the first message is received at a first time, the second message is received at a second time, and the third message is transmitted at a third time, wherein the first processing delay is a difference between the third time and the first time and the second processing delay is a difference between the third time and the second time.

36. The apparatus of claim 35, wherein the first, second, and third times are different.

37. The apparatus of claim 31, the at least one processor further configured to determine a first identifier from the first message and a second identifier from the second message, wherein the third message further comprises the first identifier and the second identifier.

38. The apparatus of claim 31, the third message further comprising a request for ranging information from a third wireless communication device, the processing system further configured to receive a fourth message comprising a processing delay from the third wireless communication device with respect to the third message.

39. The apparatus of claim 38, the fourth message further comprising an accuracy associated with the processing delay.

40. The apparatus of claim 39, the at least one processor further configured to determine a distance based on the received fourth message and on the accuracy associated with the processing delay.

41. The apparatus of claim 31, wherein the first message is received at a first time and the second message is received at a second time, the at least one processor further configured to:
send a first acknowledgment (ACK) to the first wireless communication device for the received first message at a third time; and
send a second ACK to the second wireless communication device for the received second message at a fourth time,
wherein the first processing delay is a difference between the third time and the first time and the second processing delay is a difference between the fourth time and the second time.

42. The apparatus of claim 31, the at least one processor further configured to:
transmit a fourth message comprising a request for ranging information from a third wireless communication device;
receive an acknowledgment (ACK) from the third wireless communication device for the transmitted fourth message; and
receive a fifth message comprising a processing delay from the third wireless communication device with respect to the fourth message.

43. The apparatus of claim 42, the fourth message further comprising an accuracy associated with the processing delay.

44. The apparatus of claim 43, the at least one processor further configured to determine a distance based on the received fifth message and on the accuracy associated with the processing delay.

45. An apparatus for wireless communication, comprising:
a memory; and
at least one processor coupled to the memory and configured to:
receive a first message from a first wireless communication device and a second message from a second wireless communication device;
obtain information associated with a first processing delay with respect to the first message and a second processing delay with respect to the second message; and
transmit a third message comprising an indication of the information associated with the first and second processing delays,
wherein the second message is subsequent to the first message, and wherein the third message is transmitted within a predetermined maximum time period with respect to the first message, the maximum time period being based on a clock accuracy.

46. A computer program product, comprising:
a non-transitory computer-readable medium comprising code for:
receiving a first message from a first wireless communication device and a second message from a second wireless communication device;
obtaining information associated with a first processing delay with respect to the first message and a second processing delay with respect to the second message; and
transmitting a third message comprising:
an indication of the information associated with the first and second processing delays, and
an accuracy associated with the first and second processing delays.

47. The computer program product of claim 46, wherein the first message is received at a first time, the second message is received at a second time, and the third message is transmitted at a third time, wherein the first processing delay is a difference between the third time and the first time and the second processing delay is a difference between the third time and the second time.

48. The computer program product of claim 46, the non-transitory computer-readable medium further comprising code for determining a first identifier from the first message and a second identifier from the second message, wherein the third message further comprises the first identifier and the second identifier.

49. The computer program product of claim 46, the third message further comprising a request for ranging information from a third wireless communication device, the computer-readable medium further comprising code for receiving a fourth message comprising a processing delay from the third wireless communication device with respect to the third message.

50. The computer program product of claim 46, wherein the first message is received at a first time and the second message is received at a second time, the non-transitory computer-readable medium further comprising code for:
sending a first acknowledgment (ACK) to the first wireless communication device for the received first message at a third time; and
sending a second ACK to the second wireless communication device for the received second message at a fourth time,
wherein the first processing delay is a difference between the third time and the first time and the second processing delay is a difference between the fourth time and the second time.

51. The computer program product of claim 46, the non-transitory computer-readable medium further comprising code for:
transmitting a fourth message comprising a request for ranging information from a third wireless communication device;
receiving an acknowledgment (ACK) from the third wireless communication device for the transmitted fourth message; and
receiving a fifth message comprising a processing delay from the third wireless communication device with respect to the fourth message.

* * * * *